(12) United States Patent
Su et al.

(10) Patent No.: US 11,676,273 B2
(45) Date of Patent: *Jun. 13, 2023

(54) METHODS AND SYSTEMS FOR DISPLAYING IMAGE

(71) Applicant: SHANGHAI UNITED IMAGING HEALTHCARE CO., LTD., Shanghai (CN)

(72) Inventors: Gang Su, Shanghai (CN); Yuanyuan Di, Shanghai (CN); Jinyang Li, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 174 days.

This patent is subject to a terminal disclaimer.

(21) Appl. No.: 17/187,618

(22) Filed: Feb. 26, 2021

(65) Prior Publication Data

US 2021/0183060 A1 Jun. 17, 2021

Related U.S. Application Data

(63) Continuation of application No. 16/212,652, filed on Dec. 6, 2018, now Pat. No. 10,937,154, which is a
(Continued)

(51) Int. Cl.
*G06T 7/00* (2017.01)
*G06T 11/60* (2006.01)
(Continued)

(52) U.S. Cl.
CPC ............ *G06T 7/0012* (2013.01); *G06F 3/048* (2013.01); *G06T 7/0002* (2013.01); *G06T 7/11* (2017.01);
(Continued)

(58) Field of Classification Search
CPC ..... G06T 7/0012; G06T 7/0002; G06T 11/60; G06T 7/11; G06T 2207/30168;
(Continued)

(56) References Cited

U.S. PATENT DOCUMENTS

| 10,937,154 B2 * | 3/2021 | Su .............................. G06T 7/11 |
| 2002/0096064 A1 * | 7/2002 | Fissell ..................... B41M 1/12 345/32 |

(Continued)

FOREIGN PATENT DOCUMENTS

| CN | 101350103 A | 1/2009 |
| CN | 105654532 A | 6/2016 |
| WO | 2004057439 A2 | 7/2004 |

OTHER PUBLICATIONS

International Search Report in PCT/CN2016/106747 dated Aug. 16, 2017, 7 pages.

*Primary Examiner* — Ming Y Hon
(74) *Attorney, Agent, or Firm* — Metis IP LLC

(57) ABSTRACT

The method for display may include obtaining an image to be displayed by at least one of the one or more display devices. The image may have a first region. The method may also include acquiring image information to be displayed in a second region that is displayed in the at least one of the one or more display devices. The image information may be related to the image. The method may also include acquiring a display standard associated with the image. The method may also include storing the image to at least one of the one or more storage devices. The method may also include generating a first determination that a display of the second region does not satisfy the display standard when storing the image. The method may also include generating a response based on a result of the first determination.

20 Claims, 8 Drawing Sheets

Related U.S. Application Data continuation of application No. PCT/CN2016/106747, filed on Nov. 22, 2016.

(51) Int. Cl.
*G06T 7/11* (2017.01)
*G06F 3/048* (2013.01)
*G06F 40/169* (2020.01)

(52) U.S. Cl.
CPC ............ *G06T 11/60* (2013.01); *G06F 40/169* (2020.01); *G06T 2207/10088* (2013.01); *G06T 2207/10104* (2013.01); *G06T 2207/10116* (2013.01); *G06T 2207/30004* (2013.01); *G06T 2207/30168* (2013.01)

(58) Field of Classification Search
CPC . G06T 2207/10116; G06T 2207/30004; G06T 2207/10104; G06T 2207/10088; G06F 3/048; G06F 40/169
See application file for complete search history.

(56) References Cited

U.S. PATENT DOCUMENTS

| | | | |
|---|---|---|---|
| 2003/0236836 A1* | 12/2003 | Borthwick | G06F 16/40 709/204 |
| 2005/0125728 A1* | 6/2005 | Peiro | G06F 40/151 715/235 |
| 2007/0024908 A1* | 2/2007 | Hanechak | G06T 11/60 358/1.18 |
| 2007/0052734 A1* | 3/2007 | Skinner, Jr. | G06T 19/00 345/689 |
| 2008/0097203 A1* | 4/2008 | Nereson | G01S 7/52053 600/437 |
| 2010/0034442 A1* | 2/2010 | Minakuchi | G16H 15/00 382/128 |
| 2010/0218100 A1* | 8/2010 | Simon | G06F 16/4393 715/731 |
| 2010/0223567 A1* | 9/2010 | Peterson | G09F 3/207 715/810 |
| 2011/0101104 A1* | 5/2011 | Flynn | G06F 3/1205 235/487 |
| 2011/0229864 A1* | 9/2011 | Short | G09B 7/00 434/219 |
| 2012/0204100 A1* | 8/2012 | Damera-Venkata | G06F 40/186 715/244 |
| 2014/0282055 A1* | 9/2014 | Engel | G06F 3/0482 715/744 |
| 2015/0139520 A1* | 5/2015 | Senegas | G06K 9/6269 382/131 |
| 2015/0193908 A1* | 7/2015 | Shim | G06T 7/0012 345/619 |
| 2015/0302580 A1* | 10/2015 | Serlie | G06T 7/11 382/131 |
| 2015/0310591 A1* | 10/2015 | Takahashi | G09G 5/36 345/428 |
| 2016/0048987 A1 | 2/2016 | Sevenster et al. | |
| 2016/0162966 A1* | 6/2016 | Naficy | G06Q 30/0633 705/26.5 |
| 2020/0195931 A1* | 6/2020 | Mochizuki | H04N 19/115 |

\* cited by examiner

METHODS AND SYSTEMS FOR DISPLAYING IMAGE

CROSS-REFERENCE TO RELATED APPLICATIONS

This application is a Continuation of U.S. application Ser. No. 16/212,652, filed on Dec. 6, 2018, which is a Continuation of International Application No. PCT/CN2016/106747 filed on Nov. 22, 2016, the entire contents of which are hereby incorporated by reference.

TECHNICAL FIELD

This application relates to devices and methods for medical image processing, and more particularly, to devices and methods for displaying information of a medical image.

BACKGROUND

During a medical image processing procedure, information for rapid diagnosis may be added in a medical image. For example, the added information may be displayed in the form of text during a display of the medical image. The medical image may include an imaging object (e.g., the brain of a patient). When the distance between the imaging object and the text in the medical image is greater than a predetermined value, the text cannot be stored during an archiving or clipping procedure, which may result in data loss and influence the diagnosis.

SUMMARY

According to a first aspect of the present disclosure, a system for display may include one or more display devices, one or more storage media, and one or more processors configured to communicate with the one or more storage media. The one or more storage media may include a set of instructions. When the one or more processors executing the set of instructions, the one or more processors may be directed to perform one or more of the following operations. The one or more processors may obtain an image to be displayed by at least one of the one or more display devices, the image having a first region. The one or more processors may acquire image information to be displayed in a second region that is displayed in the at least one of the one or more display devices, the image information being related to the image. The one or more processors may acquire a display standard associated with the image. The one or more processors may store the image to at least one of the one or more storage devices. The one or more processors may generate a first determination that a display of the second region does not satisfy the display standard when storing the image. The one or more processors may generate a response based on a result of the first determination.

In some embodiments, the image may include a graphic representation of an imaging object, and the graphic representation of the imaging object may be within the first region.

In some embodiments, the one or more processors may acquire an edit to the image, wherein storing the image to at least one of the one or more storage devices may include storing the image that has the edit.

In some embodiments, the one or more processors may acquire an edit to the image information.

In some embodiments, the display standard may include that all of the second region locates within the first region.

In some embodiments, the image may include a region of interest, and the image information may include at least one of statistical information of the region of interest, comment information of the region of interest, or a graphics representation of the region of interest.

In some embodiments, the one or more processors may generate a second determination that the display of the second region satisfies the display standard. The one or more processors may provide the image and the image information to be an output based on a result of the second determination.

In some embodiments, the response may include outputting a reminder, the reminder including the first determination.

In some embodiments, the reminder may include changing a color of the image information.

In some embodiments, the response may include processing at least one of the image or the image information such that the display of the second region satisfies the display standard.

In some embodiments, the response may include providing a modification suggestion for the image or the image information, and executing the modification suggestion such that the display of the second region satisfies the display standard.

According to another aspect of the present disclosure, a method for display may include one or more of the following operations. One or more processors may obtain an image to be displayed by at least one of the one or more display devices, the image having a first region. The one or more processors may acquire image information to be displayed in a second region that is displayed in the at least one of the one or more display devices, the image information being related to the image. The one or more processors may acquire a display standard associated with the image. The one or more processors may store the image to at least one of the one or more storage devices. The one or more processors may generate a first determination that a display of the second region does not satisfy the display standard when storing the image. The one or more processors may generate a response based on a result of the first determination.

BRIEF DESCRIPTION OF THE DRAWINGS

The drawings are offered for a thorough understanding of the present disclosure, and the drawings are parts of the present disclosure. The illustrative examples are for the purpose of describing particular example embodiments only and is not intended to be limiting. The same component in different figures is signed with the same label.

DETAILED DESCRIPTION

Figure 1:
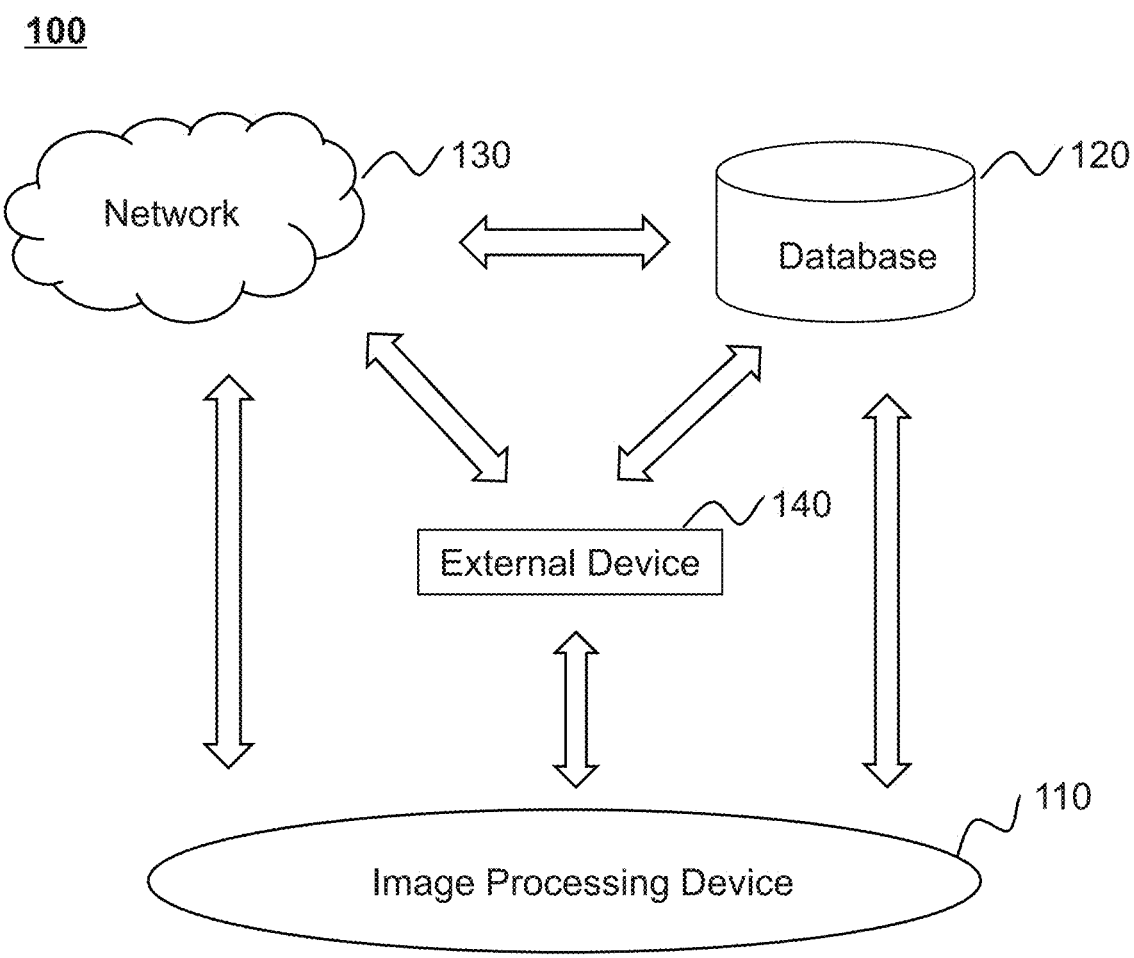
FIG. 1 is a schematic diagram illustrating an exemplary image processing system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Although the present disclosure makes various references to certain modules in the system according to some embodiments of the present disclosure, any number of different modules may be used and run on a client terminal and/or a server. The modules are illustrative only, and different aspects of the systems and methods may use different modules.

A flowchart is used in the present disclosure to describe operations performed by a system in accordance with some embodiments of the present disclosure. It should be understood that the preceding or following operations are not necessarily performed exactly in sequence. Instead, the various steps may be processed in reverse sequence and/or simultaneously. Moreover, other operations may also be added into these procedures, or one or more steps may be removed from these procedures.

FIG. 1 is a schematic diagram illustrating an exemplary image processing system according to some embodiments of the present disclosure. The image processing system 100 may include an image processing device 110, a database 120, a network 130, and an external device 140.

In some embodiments, the image processing device 110 may process medical images (also called "image" in this application). The processing may be automatically performed by the image processing device 110 or be performed based on user interaction with the image processing device 110. The automatic processing may cause the image attributes and the location status of an information window relative to the location of a specific region (e.g., also referred to herein as a second region) to satisfy a display standard. In some embodiments, the automatic processing may include editing an image and editing image information.

In some embodiments, the image information may include statistical information, comment information, a graphical representation, or the like, or a combination thereof. As used herein, the graphical representation is a graphical form of information (e.g., the statistical information or the comment information). The statistical information may be statistical information of a region of interest in the image. The statistical information of the region of interest may be a maximum feature of the region of interest, a minimum feature of the region of interest, the area of the region of interest, the perimeter of the region of interest, the number of pixels in the region of interest, the variation or distribution of pixels values of the region of interest, or the like, or a combination thereof. The statistical information may be in the form of text or graphics, or a combination thereof. For example, the statistical information may be shown in the form of graphics representation (e.g., histogram, curve chart, or a combination thereof). The maximum and the minimum features of the region of interest may be respectively a maximum value and a minimum value of a pixel parameter. The pixel parameter may include a computed tomography (CT) value, a gray value, luminance, or the like, or a combination thereof. The comment information may relate to the medical image. In some embodiments, the comment information may include the analysis of the medical image, such as focus information shown in the medical image. The focus information may be diagnosis and severity of a focus. For example, a user may draw a region of interest based on the CT image and obtain statistical information of the region of interest. The user may create comment information by determining whether there is a focus in the region of interest and the severity of the focus. The specific region may be a region configured to display the image information in the medical image.

In some embodiments, the user interaction may include editing an image, setting a display standard, editing image information, drawing a region of interest, or determining a specific region. In some embodiments, the image processing device 110 may include a processor, a power processor unit (PPU), one or more storages, or the like, or a combination thereof. In some embodiments, the image processing device 110 may be an imaging device with a function of processing medical images. The imaging device may include an X-ray imaging device, a computed tomography (CT) imaging device, a positron emission tomography (PET) imaging device, a magnetic resonance imaging (MRI) device, an ultrasound imaging device, a cardiograph machine, an electroencephalography (EEG) machine, etc. In some embodiments, the image processing device 110 may be a computer. In some embodiments, the image processing device 110 may process medical images obtained from the database 120. In some embodiments, the image processing device 110 may process medical images obtained from the network 130. In some embodiments, the image processing device 110 may process medical images obtained from the external device 140.

In some embodiments, the database 120 may be a device with storage function. The database 120 may store data (e.g., processed images processed by the image processing device 110) collected by the image processing device 110 and data output from the external device 140 (e.g., medical images output from the external device 140 to the image processing device 110). The database 120 may be local or remote. The database 120 may include a hierarchical database, a network database, a relational database, or the like, or a combination thereof. The database 120 may digitize information and store the digitized information in an electric storage device, a magnetic storage device, an optical storage device, etc. The database 120 may store various information, such as procedures, data, etc. The database 120 may be a device that stores information using electric energy, such as a memorizer, a random access memory (RAM), a read-only memory (ROM), or the like, or a combination thereof. The RAM may include a dekatron, a selectron, a delay line memory, a Williams tube, a dynamic random access memory (DRAM), a static random access memory (SRAM), a thyristor random access memory (T-RAM), a zero capacitor random access memory (Z-RAM), or the like, or a combination thereof. The ROM may include a read-only memory bubble memory, a magnetic button line memory, a memory thin film, a magnetic plate line memory, a core memory, a magnetic drum memory, a CD-ROM drive, a hard disk, a magnetic tape, an early nonvolatile memory (the NVRAM), a phase change memory, a magnetoresistive random access memory modules, a ferroelectric random access memory, a nonvolatile SRAM, a flash memory, a type of electronic erasing rewritable read-only memory, an erasable programmable read-only memory, a programmable read-only memory, a mask ROM, a floating connecting doors random access memory, a nanometer random access memory, a racetrack memory, a variable resistive memory, a programmable metallization cell, or the like, or a combination thereof. The database 120 may be a device that stores information using magnetic energy, such as a hard disk, a floppy disk, a magnetic tape, a magnetic core memory, a bubble memory, a U disk, a flash memory, or the like, or a combination thereof. The database 120 may be a device that stores information using optics energy, such as a CD, a DVD, or the like, or a combination thereof. The database 120 may be a device that stores information using magnetic-optics energy, such as a magneto-optical disk. The database 120 may store information in, for example, a random storage mode, a serial access storage mode, a read-only storage mode, or the like, or a combination thereof. In some embodiments, the database 120 may be a non-permanent memory, a permanent memory, or a combination thereof. It should be noted that the above description of the database is provided for the purpose of illustration, and not intended to limit the scope of the present disclosure.

The network 130 may be a single network or a combination of different networks. For example, the network 130 may be a local area network (LAN), a wide area network (WAN), a public network, a private network, a proprietary network, a public switched telephone network (PSTN), Internet, a virtual network, a metropolitan area network (MAN), a telephone network, or a combination thereof. The network 130 may include multiple network access points (NAP), e.g., wired access points, wireless access points, base stations, Internet exchange points, etc. Through these access points, the data source may be accessed via the network 130 and information may be delivered via the network 130. In some embodiments, the network 130 may include a wireless network (Bluetooth™ link, Wi-Fi™ link, WiMax™ link, etc.), a mobile network link (e.g., 2G, 3G, 4G, etc.), or other data access way, for example, a virtual private network, (VPN), a shared network, a near field communication, (NFC), a ZigBee link, etc. In some embodiments, the network 130 may be configured to communicate with the image processing system 100 and to receive information from the image processing system 100 or devices outside the image processing system 100, and to deliver information to the image processing system 100 or devices outside the image processing system 100. In some embodiments, the connection to the network 130 by the image processing device 110, the database 120, and the external device 140 may be wired, wireless, or a combination thereof.

In some embodiments, the external device 140 may transmit data to the image processing device 110 and/or receive data from the image processing device 110. In some embodiments, the external device 140 may transmit data to the database 120 and/or receive data from the database 120. In some embodiments, the data transmitted or received by the external device 140 may be medical images. In some embodiments, the external device 140 may include an input device, an output device, or the like, or a combination thereof. The input device may include a character input device (e.g., a keyboard), an optical reading device (e.g., an optical mark reader or an optical character reader), a graphics input device (e.g., a mouse, a joystick, or a light pen), an image input device (e.g., a camera, a scanner, a fax device, etc.), an analog input device (e.g., an analog-digital conversion in language recognition system), or the like, or a combination thereof. The output device may include a display device, a printer, a plotter, an image output device, a speech output device, a magnetic recording device, or the like, or a combination thereof. In some embodiments, the external device 140 may include an input device and an output device such as a desktop computer, a laptop, a smartphone, a tablet PC, a personal digital assistant (PDA), etc.

It should be noted that the above description of the image processing system 100 is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure. For example, the database 120 may be a cloud computing platform with data storage function, e.g., public cloud, private cloud, community cloud and hybrid cloud. All such modifications are within the protection scope of the present disclosure.

Figure 2:
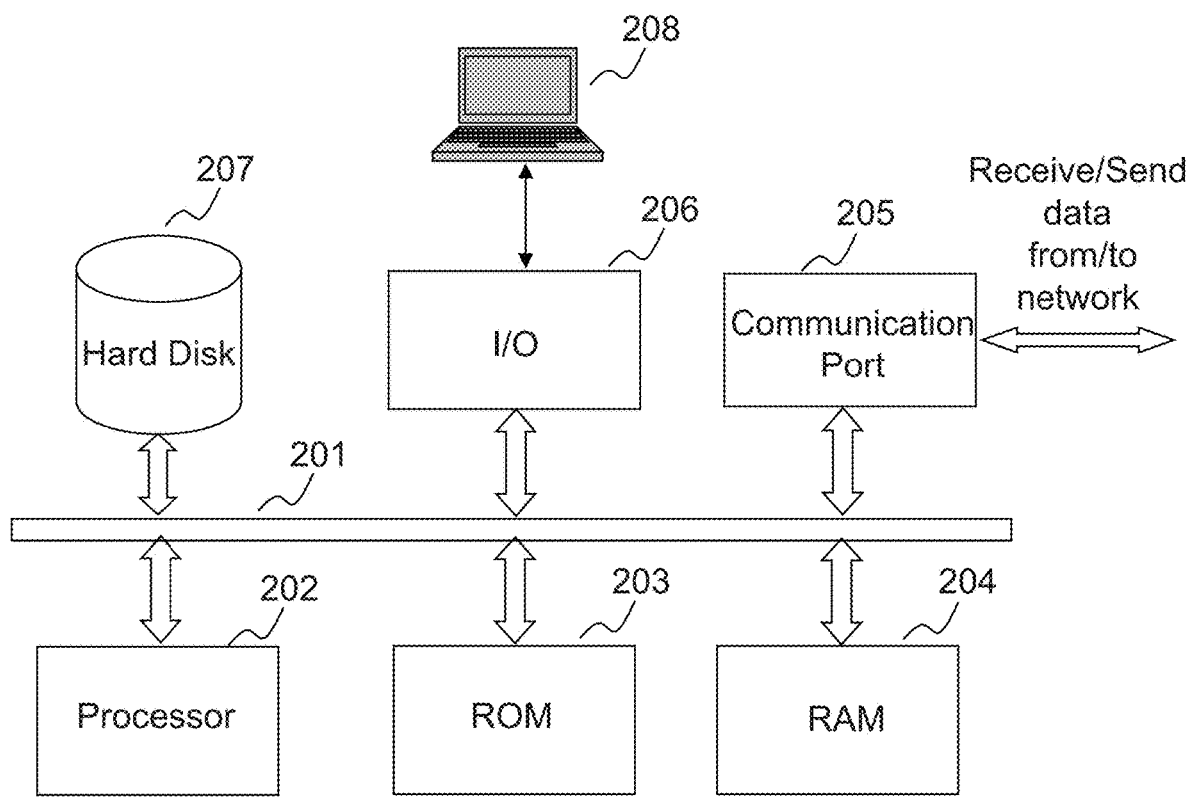
FIG. 2 is a schematic diagram illustrating hardware and software components of an exemplary computing device according to some embodiments of the present disclosure.

FIG. 2 is a schematic diagram illustrating hardware and software components of an exemplary computing device according to some embodiments of the present disclosure. The computing device 200 may be configured to perform the specific device and method described in the present disclosure. The specific device described in the present disclosure shows a hardware platform with a display module using functional block diagram (FBD). In some embodiments, the computing device 200 may perform as one or more modules or units in the image processing device 110 described in the present disclosure. In some embodiments, the image processing device 110 may be implemented by the computing device 200 by hardware, software, firmware or any combination thereof. In some embodiments, the computing device 200 may be a computer in common use or a computer for specific use.

As shown in FIG. 2, the computing device 200 may include an internal communication bus 201, a processor 202, a read-only memory (ROM) 203, a random access memory (RAM) 204, a communication port 205, an input/output (I/O) 206, a hard disk 207, and a user interface 208. The internal communication bus 201 may establish communication among components in the computing device 200. The processor 202 may perform a determination and generate a reminder. In some embodiments, the processor 202 may include multiple processors. The communication port 205 may establish communication between the computing device 200 and components (e.g., the external device 140 and the database 120) in the image processing system 100.

In some embodiments, the computing device 200 may transmit information/data to and/or receive information/data from the communication port 205 through the network 130. The I/O 206 may support the I/O data stream between the computing device 200 and components (e.g., the external device 140 and the database 120) in the image processing system 100. The user interface 208 may exchange information/data between the computing device 200 and users. The computing device 200 may also include different kinds of program storage units and data storage units, e.g., the hard disk 207, the read-only memory (ROM) 203, the random access memory (RAM) 204. The program storage units may store data files for computer processing and/or communication, and executable program instructions by the processor 202.

Figure 3:
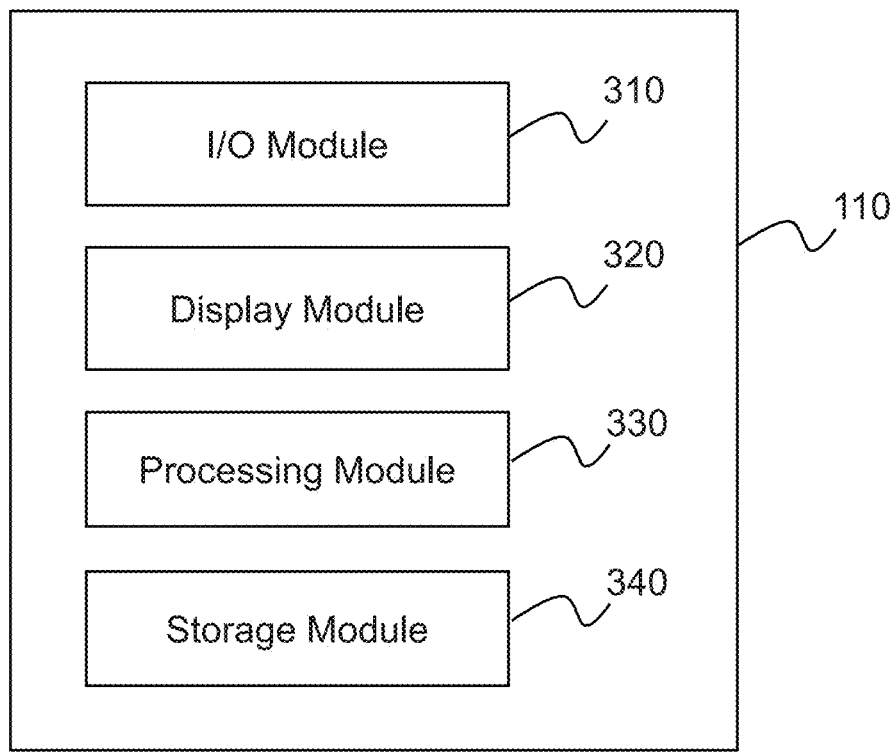
FIG. 3 is a block diagram illustrating an exemplary image processing device according to some embodiments of the present disclosure.

FIG. 3 is a block diagram illustrating an exemplary image processing device according to some embodiments of the present disclosure. The image processing device 110 may include an input/output (I/O) module 310, a display module 320, a processing module 330, and a storage module 340.

The I/O module 310 may be configured to input and/or output data. The data may be a medical image, a display standard of the medical image, user interaction, or the like, or a combination thereof. In some embodiments, the medical image may include or not include image information. In some embodiments, the medical image may include a region of interest (ROI). In some embodiments, the medical image may be a medical image that is processed or not processed. In some embodiments, the medical image may be an X-ray image, a computed tomography (CT) image, a positron emission tomography (PET) image, a magnetic resonance imaging (MRI) image, an ultrasound image, a cardiograph image, an electroencephalography (EEG) image, or the like, or a combination thereof. In some embodiments, the medical image may be a two-dimensional (2D) image or a three-dimensional (3D) image. The type of the medical image may include Joint Photographic Experts Group (JPEG), Tagged Image File Format (TIFF), Graphics Interchange Format (GIF), Kodak Flash PiX (FPX), Digital Imaging and Communications in Medicine (DICOM), etc. In some embodiments, the display standard may be set by a user or the image processing device 110. In some embodiments, the display standard may relate to an attribute of the medical image. The image attribute may include a pixel, a color, a depth, a resolution, a hue, saturation, brightness, contrast, or the like, or a combination thereof. In some embodiments, the display standard may relate to the location status of the information window relative to the location of the specific region. In some embodiments, the location status of the information window relative to the location of the specific region may include a portion of the image information being located outside the specific region, or all of the image information being located within the specific region. In some embodiments, the user interaction may include editing an image, setting a display standard, editing image information, drawing a region of interest, determining a specific region, or the like, or a combination thereof. In some embodiments, the editing of (or the edit to) the image may include performing an operation to a portion of the image or the whole image, such as rotating, zooming, cutting, modifying an attribute, or the like, or a combination thereof. In some embodiments, the editing of (or the edit to) the image information may include creating image information and/or modifying image information. In some embodiments, the image information may include statistical information, comment information, a graphical representation, or the like, or a combination thereof. As used herein, the graphical representation may be a graphical form of information (e.g., the statistical information or the comment information). The statistical information may be statistical information of a region of interest in the image. The statistical information of the region of interest may be a maximum feature of the region of interest, a minimum feature of the region of interest, the area of the region of interest, the perimeter of the region of interest, the number of pixels in the region of interest, the variation or distribution of pixels values of the region of interest, or the like, or a combination thereof. The statistical information may be represented in the form of text or graphics, or a combination thereof. For example, the statistical information may be shown in the form of graphics representation (e.g., histogram, curve chart, or a combination thereof). The maximum and the minimum features of the region of interest may be respectively a maximum value and a minimum value of a pixel parameter. The pixel parameter may include a computed tomography (CT) value, a gray value, luminance, or the like, or a combination thereof. The comment information may relate to the medical image. In some embodiments, the comment information may be analysis and understanding of the medical image, such as focus information shown in the medical image. The focus information may be diagnosis and severity of a focus. For example, a user may draw a region of interest based on the CT image and obtain statistical information of the region of interest. The user may create comment information by determining whether there is a focus in the region of interest and the severity of the focus. The specific region may be configured to display the image information.

In some embodiments, the I/O module 310 may receive data from the database 120, the storage module 340, or the external device 140. In some embodiments, the I/O module 310 may output the received data to other components or parts in the image processing device 110. In some embodiments, the data received by the I/O module 310 may be stored in the database 120 or the storage module 340, or processed by the processing module 330. In some embodiments, the I/O module 310 may transmit/receive data through the I/O 206 in the computing device 200.

The display module 320 may display data in the image processing device 110. In some embodiments, the display module 320 may display data input/output by the I/O module 310. In some embodiments, the display module 320 may display data stored in the storage module 340. The data may be a medical image. For example, the medical image may be a medical image processed by the processing module 330, or a medical image that is not processed by the processing module 330. The medical image may include a graphic representation of an imaging object (e.g., a graphic representation of the brain of a patient), image information, a region of interest, a specific region, or the like, or a combination thereof. In some embodiments, the graphic representation of the imaging object may be associated with an object contour; the region of interest may be associated with a contour of the region of interest; and the specific region may be associated with a specific region contour. The contour may be a shape that encloses the graphic representation of the imaging object, the region of interest, or the specific region, and separates the graphic representation of the imaging object, the region of interest, or the specific region from the surrounding or the background. The shape may be regular or irregular. The contour may be closed or open. A region within the object contour in the medical image may be referred to as an image region (e.g., also referred to as first region). The graphic representation of the imaging object may locate in the image region. The specific region may be configured to display the image information. In some embodiments, all of the specific region may locate in the image region, or a portion of the specific region may locate in the image region. In some embodiments, the specific region may be the image region, a region defined by a user, or a region determined based on an image attribute or a storage mode. In some embodiments, the specific region may be determined by the processing module 330. The image attribute may include a pixel, a color, a depth, a resolution, a hue, saturation, brightness, contrast, or the like, or a combination thereof. In some embodiments, all data of the medical image may be stored in a storage device (e.g., the database 120, the hard disk 207, the ROM 203, the RAM 204). In some embodiments, partial data (e.g., the graphic representation of the imaging object and the image information) of the medical image may be stored in a storage device (e.g., the database 120, the hard disk 207, the ROM 203, the RAM 204). In some embodiments, the display module 320 may display one or more toolbar icons for image processing. In some embodiments, a toolbar icon for image processing may relate to editing image information, drawing a region of interest, editing an image, storing an image, setting a display standard, determining a specific region, or the like, or a combination thereof. For example, the display module 320 may display an icon for saving the image in a storage device, an icon for image clipping, an icon for creating a text window, etc. In some embodiments, the display module 320 may generate a response to the result of the image processing performed by a user or the processing module 330, and show different displays based on the response. In some embodiments, the display module 320 may display data through the user interface 208 in the computing device 200.

The processing module 330 may process data. The data to be processed may be a medical image. In some embodiments, the data may be an image region of the medical image, a region of interest of the medical image, an image attribute of the medical image, image information of the medical image, etc. In some embodiments, the processing module 330 may generate an image coordinate system and a window coordinate system. In some embodiments, the processing module 330 may determine the coordinate information of a specific region and the coordinate information of the image information in the image coordinate system. The coordinate information of the image information may be the coordinate information of an information window. The information window may be a window enclosing all of the image information. In some embodiments, the information window may be the smallest window enclosing all of the image information. The shape of the information window may be a rectangle, a square, a circle, an oval, an irregular shape, or the like, or a combination thereof. In some embodiments, the processing module 330 may obtain the coordinate information of a vertex (e.g., the top left corner) of the information window in the window coordinate system. The processing module 330 may also obtain or determine the length and the width of the information window.

The processing module 330 may obtain the coordinate information of the information window in the window coordinate system based on the coordinate information of a vertex in the window coordinate system, the length of the information window, and the width of the information window. In some embodiments, the processing module 330 may transform the coordinate information of the information window in the window coordinate system to the coordinate information of the information window in the image coordinate system.

In some embodiments, the processing module 330 may obtain statistical information of the region of interest. The statistical information may be a maximum feature of the region of interest, a minimum feature of the region of interest, the area of the region of interest, or the like, or a combination thereof. The maximum and the minimum feature of the region of interest may be respectively the maximum value and a minimum value of a pixel parameter, which may include a CT value, a gray value, luminance, or the like, or a combination thereof. The specific region may be determined by the processing module 330 based on the image attribute(s). In some embodiments, the processing module 330 may determine whether the processed image satisfies a display standard. In some embodiments, the display standard may relate to an image attribute. The image attribute may include a pixel, a color, a depth, a resolution, a hue, saturation, brightness, contrast, or the like, or a combination thereof. In some embodiments, the display standard may relate to the location status of the information window relative to the location of the specific region. In some embodiments, the determination as to whether the processed image satisfies the display standard may be made before the processed image is stored or saved (e.g., during an image archiving or clipping process). The processing of the image may be performed by the processing module 330 or according to one or more instructions of a user. For example, the processing module 330 may determine the location status of the information window relative to the location of the specific region. In some embodiments, the processing module 330 may process the medical image based on the location status of the information window relative to the location of the specific region. In some embodiments, the processing module 330 may process data through the processor 202 in the computing device 200. Detailed descriptions of the processing module 330 may be found elsewhere in the present disclosure in connection with FIG. 5.

The storage module 340 may be configured to store data. The data may be received through the I/O module 310. In some embodiments, the received data may be a medical image, a display standard, image information, or the like, or a combination thereof. The data may be intermediate data generated when the processing module 330 performs data processing. In some embodiments, the intermediate data may be coordinate information of the medical image, coordinate information of the specific region, and coordinate information of the image information. The data may be a processed medical image processed by a user. The data may be a processed medical image processed by the processing module 330. In some embodiments, the processing module 330 may determine whether the processed image satisfies the display standard when data is stored. In some embodiments, the storage module 340 may store data through the hard disk 207, the read-only memory (ROM) 203, the random access memory (RAM) 204, or the like, or a combination thereof.

It should be noted that the above description of the image processing device 110 is provided for the purpose of illustration, and not intended to limit the scope of the present disclosure. For persons having ordinary skills in the art, modules may be combined in various ways, or connected with other modules as sub-systems. For example, in some embodiments, the processing module 330 and the storage module 340 may be two separate modules or a module with a processing function and a storage function. As another example, the storage module 340 may be omitted, and the image processing device 110 may store data through the database 120 and/or the external device 140. All such modifications are within the scope of the present disclosure.

Figure 4:
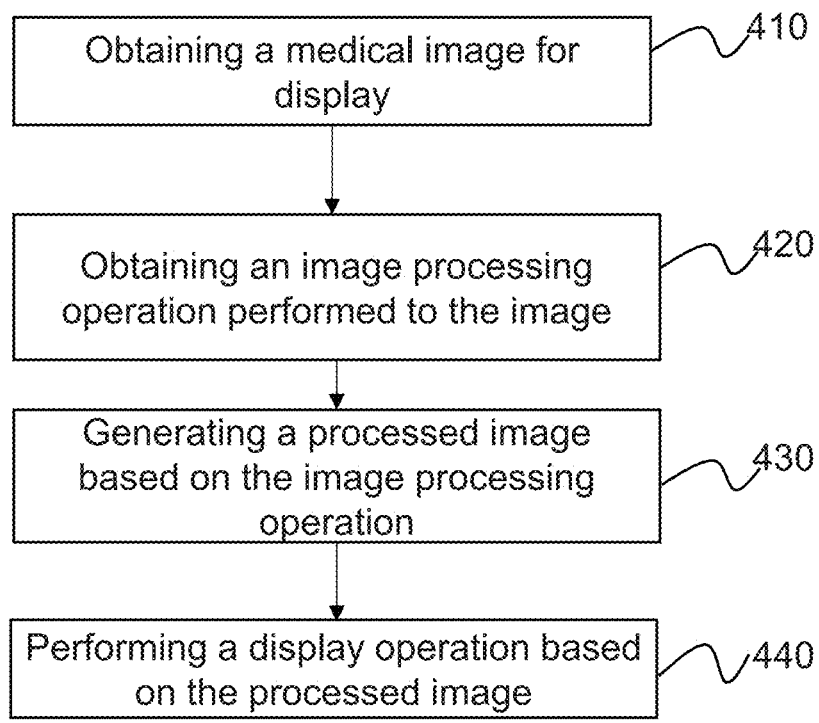
FIG. 4 is a flowchart illustrating an exemplary process of image processing according to some embodiments of the present disclosure.

FIG. 4 is a flowchart illustrating an exemplary process for image processing according to some embodiments of the present disclosure. In some embodiments, one or more steps or operations of the process for image processing may be performed by the image processing device 110.

In 410, a medical image (also called "image" in this application) may be provided/obtained for display. The image may have certain image characteristics, which may include an image attribute and/or the location status of the information window relative to the location of the specific region. The image attribute may include a pixel, a color, a depth, a resolution, a hue, saturation, brightness, contrast, or the like, or a combination thereof. The image may include an image region. In some embodiments, the image may include or not include image information on it. The image may include or not include a region of interest. The image may include or not include a specific region.

In 420, an image processing operation to be performed on the image may be obtained. The image processing operation may be based on user interaction and/or automatic processing of a device. The user interaction may include editing the image, setting a display standard, editing image information, drawing a region of interest, or determining a specific region, etc. The editing of the image may include performing an operation to a portion of the image or the whole image, such as rotating, zooming, cutting, modifying an attribute, or the like, or a combination thereof. The editing of image information may include creating new image information and/or modifying existing image information in the image. Automatic processing by a device may include automatic editing of the image and editing image information. Automatic editing of the image may include automatically performing an operation to a portion of the image or the whole image, such as rotating, zooming, cutting, modifying an attribute, or the like, or a combination thereof.

In 430, a processed image may be generated based on the image processing operation to the image. The processed image may be displayed. The processed image may include some image characteristics. The image characteristics of the processed image may be the same as or different from the image characteristics of the image provided for display described in 410. In some embodiments, the processed image may include or not include image information on it. In some embodiments, the processed image may include or not include a region of interest. In some embodiments, the processed image may include or not include a specific region.

It should be noted that 420 may be performed before or simultaneously with 430. Operation 420 being performed simultaneously with 430 means that there are multiple image processing operations in 420, and 430 may display the processed image(s) in each image processing operation in real time.

In 440, a display operation may be performed based on the processed image. In some embodiments, the display operation may be performed based on a determination as to whether the processed image satisfies the display standard. The display operation may include outputting the processed image or generating a response to the determination. Detailed descriptions of the process for performing the display operation based on the processed image may be found elsewhere in the present disclosure in connection with FIG. 6.

It should be noted that the above description of the process for image processing is provided for the purpose of illustration, and not intended to limit the scope of the present disclosure. For persons having ordinary skills in the art may change the image processing flowchart by adding or deleting one or more operations under the teaching of the present disclosure. However, those variations and modifications may not depart from the spirit and scope of this disclosure. For example, 420 and/or 430 may be omitted, and the display operation may be performed based on the displayed image. All such modifications are within the protection scope of the present disclosure.

Figure 5:
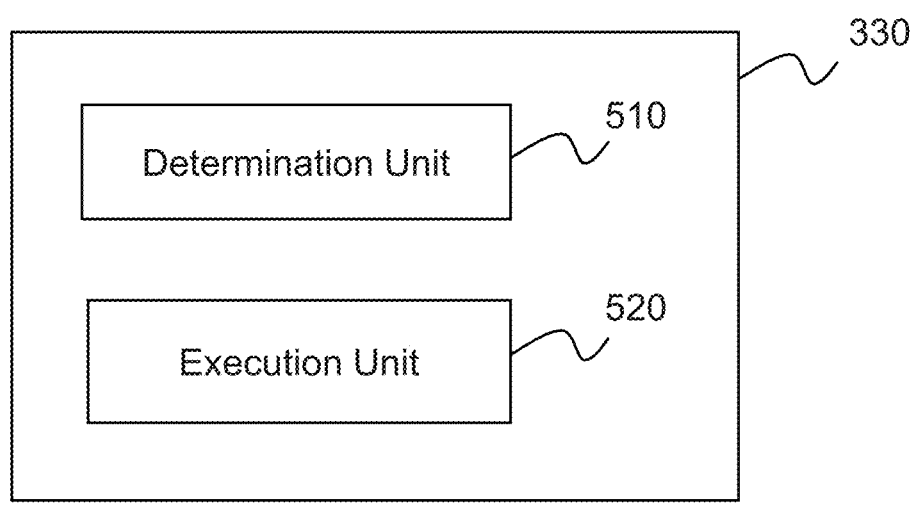
FIG. 5 is a block diagram illustrating an exemplary processing module according to some embodiments of the present disclosure.

FIG. 5 is a block diagram illustrating an exemplary processing module according to some embodiments of the present disclosure. The processing module 330 may include a determination unit 510 and an execution unit 520. In some embodiments, the determination unit 510 and the execution unit 520 may be implemented on the processor 202 in the computing device 200.

The determination unit 510 may determine whether an image to be displayed satisfies a display standard. In some embodiments, the determination as to whether an image satisfies a display standard may be made before the image is stored (e.g., during an image archiving or clipping process). In some embodiments, the display standard may be set by a user or the image processing device 110. In some embodiments, the user may set the display standard before an image processing operation is performed. In some embodiments, the user may set the display standard when or after an image processing operation is performed. The display standard may relate to an image attribute. Alternatively or additionally, the display standard may relate to the location status of an information window relative to the location of a specific region.

The image attribute relating to the display standard may include a pixel, a color, a depth, a resolution, a hue, saturation, brightness, contrast, or the like, or a combination thereof. In some embodiments, the image may be an image received through the I/O module 310 or a processed image. The image processing operation may be based on user interaction and/or automatic processing of a device. The user interaction may include editing an image, setting a display standard, editing image information, drawing a region of interest, or determining a specific region, etc. The determination unit 510 may determine whether the image attribute satisfies the display standard. For example, the determination unit 510 may compare the image attribute with the display standard and determine whether the image attribute satisfies the display standard based on the comparison result.

Alternatively or additionally, the determination unit 510 may determine whether the location status of the information window relative to the location of the specific region satisfies the display standard. In some embodiments, the determination unit 510 may compare the coordinate information of the information window (also referred to herein as the coordinate information of the image information) with the coordinate information of the specific region in the image coordinate system. The determination unit 510 may determine whether the location status of the information window relative to the location of the specific region satisfies the display standard based on the comparison result. In some embodiments, the determination unit 510 may compare the text relating to the image in a display region of the image information and the text relating to the image in the specific region. The determination unit 510 may determine whether the location status of the information window relative to the location of the specific region satisfies the display standard based on the comparison result. For example, the determination unit 510 may compare a gray value in the display region of the image information (or in the information window) and a gray value in the specific region, and determine whether the difference between the gray value of the display region of the image information and the gray value of the specific region is lower than a predetermined threshold. Merely by way of example, all of the information window may be located in the specific region, and the area of the information window equals to the area of the specific region; or a portion of the information window may be located outside the specific region.

In some embodiments, the determination unit 510 may obtain statistical information of the region of interest. The statistical information of the region of interest may include a maximum feature of the region of interest, a minimum feature of the region of interest, the area of the region of interest, the perimeter of the region of interest, the number of pixels in the region of interest, the variation or distribution of pixels values of the region of interest, or the like, or a combination thereof. The statistical information may be in the form of character or graphics, or a combination thereof. For example, the statistical information may be shown in the form of graphics representation (e.g., histogram, curve chart, or a combination thereof). The maximum and the minimum feature of the region of interest may be respectively a maximum value and a minimum value of a pixel parameter. The pixel parameter may include a CT value, a gray value, luminance, or the like, or a combination thereof. In some embodiments, the determination unit 510 may determine the specific region. The specific region may be configured to display the image information. In some embodiments, the determination unit 510 may determine the specific region based on the image attribute, the image information characteristics, the image region, the region of interest, or the like, or a combination thereof. The image information character may include a font size, a color, a typeface, or the like, or a combination thereof. In some embodiments, the determination unit 510 may determine a region with a light color or high brightness (e.g., a blank region in the image region) as the specific region. In some embodiments, the determination unit 510 may select a region that is not included in the region of interest in the image region as the specific region.

A display operation may be performed by the execution unit 520. In some embodiments, the display operation may be related to the determination of the determination unit 510. The determination of the determination unit 510 may include whether the image attribute satisfies the display standard, and/or the location status of the information window relative to the location of the specific region satisfies the display standard. The display operation may include outputting an image. In some embodiments, the display operation may include generating a response in response to a determination that the image attribute does not satisfy the display standard, and/or a determination that the location status of the information window relative to the location of the specific region does not satisfy the display standard. The response may include outputting a reminder, processing an image automatically, providing modification suggestion of an image, or the like, or a combination thereof. The reminder may be configured to remind a user that the image attribute and/or the location status of the information window relative to the location of the specific region does not satisfy the display standard. In some embodiments, the reminder may include changing a color of the image information, displaying a pop-up window, giving an alarm, or the like, or a combination thereof. The automatic processing may cause the image attribute and the location status of the information window relative to the location of the specific region to satisfy the display standard. The automatic processing may include editing the image and/or editing image information. In some embodiments, editing the image may include performing some operations to a portion of the image or the whole image, such as rotating, zooming, cutting, modifying an attribute, or the like, or a combination thereof. In some embodiments, editing image information may include creating image information and/or modifying image information on the image. The modification may include adding the text of the image information, deleting the text (or a portion thereof) of the image information, changing text characteristics of the image information, or the like, or a combination thereof. The image information character may include a font size, a color, a typeface, the number of words per line, the number of lines, or the like, or a combination thereof. The modification suggestion may be related to at least one of an image attribute, an image location, a location of the information window, text characteristics of the image information, etc. In some embodiments, the modification suggestion may include moving the information window, reminding a modified location of the information window, changing the word size of the text in the image information, changing the display standard, or the like, or a combination thereof.

It should be noted that the above descriptions of the processing module 330 are provided for the purpose of illustration, and not intended to limit the scope of the present disclosure. For persons having ordinary skills in the art may change the processing module by adding or deleting one or more units under the teaching of the present disclosure. However, those variations and modifications may not depart from the spirit and scope of this disclosure. For example, in some embodiments, the processing module 330 may include a storage unit. All such modifications are within the protection scope of the present disclosure.

Figure 6:
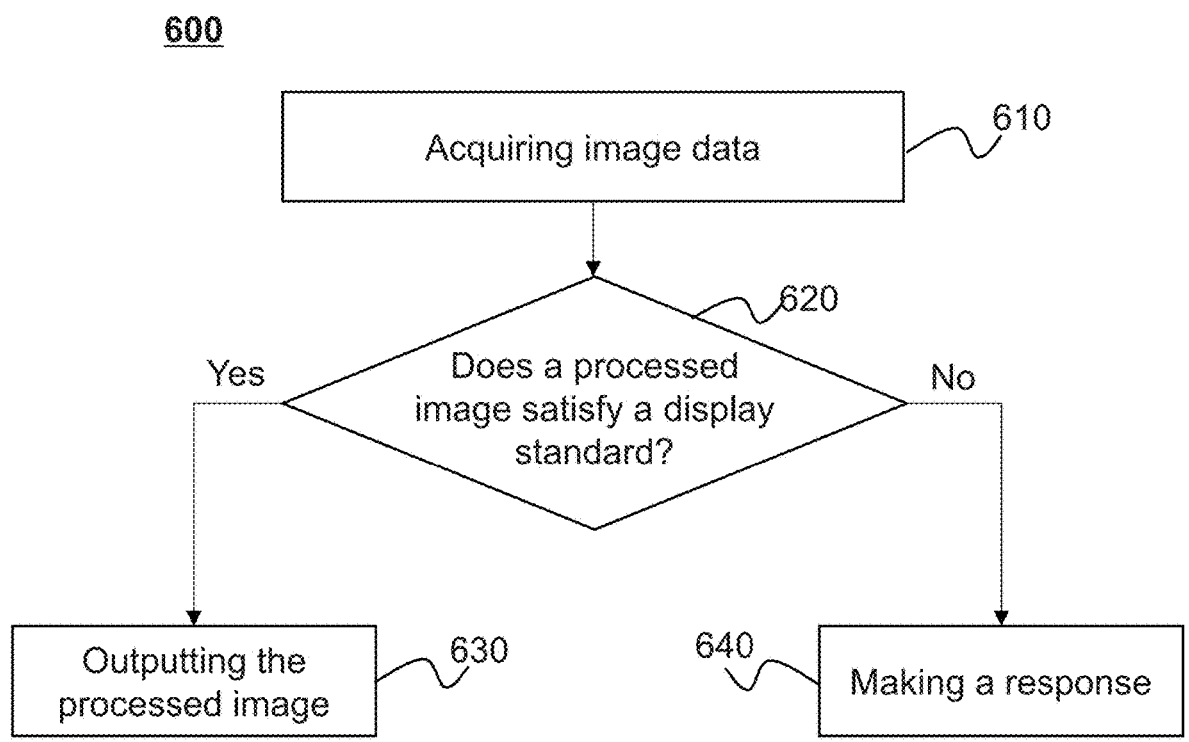
FIG. 6 is a flowchart illustrating an exemplary process of image processing according to some embodiments of the present disclosure.

FIG. 6 is a flowchart illustrating an exemplary process for image processing according to some embodiments of the present disclosure. In some embodiments, the process for image processing may be performed by the processing module 330. Operation 440 of the process 400 may be implemented based on the process 600.

In 610, the image data related to a processed image may be obtained. The processed image may be obtained by processing a medical image based on an image processing operation. The image processing operation may be based on user interaction and/or automatic processing of a device. In some embodiments, the image data may include an image characteristics, an image size, or an image location. The image characteristics may include an image attribute and/or the location status of an information window relative to the location of a specific region. The image attribute may include a pixel, a color, a depth, a resolution, a hue, saturation, brightness, contrast, or the like, or a combination thereof.

In 620, a determination as to whether the processed image satisfies a display standard. In some embodiments, the determination as to whether the processed image satisfies a display standard may be made before the processed image is stored (e.g., during an image archiving or clipping process). The processed image may include some image characteristics. The image characteristics may be the same as or different from the image characteristics in 610. In some embodiments, the display standard may be related to an image attribute. The image attribute may include a pixel, a color, a depth, a resolution, a hue, saturation, brightness, contrast, or the like, or a combination thereof. In some embodiments, the image attribute and the display standard may be compared to determine whether the processed image satisfies the display standard. In some embodiments, a determination that the processed image satisfies the display standard may be made in response to a determination that the image attribute satisfies the display standard or a determination that the difference between the image attribute and the display standard is within a threshold. In some embodiments, the display standard may be related to the location status of the information window relative to the location of the specific region. In some embodiments, the location status of the information window relative to the location of the specific region may be compared to determine whether the processed image satisfies the display standard. In some embodiments, the specific region may be the image region. When the entire information window is located in the image region, a determination that the processed image satisfies the display standard may be made. In some embodiments, the location status of the information window relative to the location of the specific region may be obtained by determining the coordinate information of the information window and the coordinate information of the specific region. For example, in 620, an image coordinate system may be generated. The image coordinate system may be a rectangular coordinate system with the origin being the center of the image. The coordinate information of the specific region and the coordinate information of the image information in the image coordinate system may be obtained. The coordinate information of the image information may be obtained based on the location and the area of the information window, or the image information. The location status of the information window relative to the location of the specific region may be obtained by comparing the coordinate information of the image information and the coordinate information the specific region.

Operation 630 may be performed in response to a determination that the processed image satisfies the display standard in 620. In 630, the processed image may be output. In some embodiments, the processed image may be stored in the storage module 340, the database 120, the external device 140, or the like, or a combination thereof. Operation 640 may be performed in response to a determination that the processed image does not satisfy the display standard in 620.

In 640, a response may be generated. The response may include outputting a message, processing the processed image automatically, providing modification suggestion of the processed image, or the like, or a combination thereof. The message may be configured to remind a user that the image attribute, and/or the location status of the information window relative to the location of the specific region does not satisfy the display standard. In some embodiments, the message may include changing a color of the image information, displaying a pop-up window, generating an alarm, or the like, or a combination thereof. The automatic processing may make the image attribute, and the location status of the information window relative to the location of the specific region satisfy the display standard. The automatic processing may include editing the processed image and editing image information. In some embodiments, the editing of (or the edit to) the processed image may include performing some operations to a portion of the processed image or the whole processed image, such as rotating, zooming, cutting, modifying an attribute, or the like, or a combination thereof. In some embodiments, the editing of (or the edit to) the image information may include creating image information and/or modifying image information. The modification may include adding the text of the image information, deleting a text of the image information, changing text characteristics of the image information, or the like, or a combination thereof. The modification suggestion may be related to at least one of an image attribute, an image location, a location of the information window, text characteristics of the image information, etc. The user may further enter instructions to cause the processed image to be further processed based on the modification suggestion. In some embodiments, the modification suggestion may include moving the information window, reminding a modified location of the information window, changing the word size of the text in the image information, changing the display standard, or the like, or a combination thereof.

It should be noted that the above descriptions are provided for the purpose of illustration, and not intended to limit the scope of the present disclosure. For persons having ordinary skills in the art may change the processing flowchart by adding, deleting or repeating one or more steps or operations under the teaching of the present disclosure. However, those variations and modifications may not depart from the spirit and scope of this disclosure. For example, after the response is made in 640, the process 600 may obtain an automatically processed image or a further processed image by a user to further determine whether the automatically processed image or the further processed image by the user satisfies the display standard. All such modifications are within the protection scope of the present disclosure.

Figure 7A:
FIGS. 7A and 7B are exemplary image information displayed by an image processing device according to some embodiments of the present disclosure.
Figure 7B:
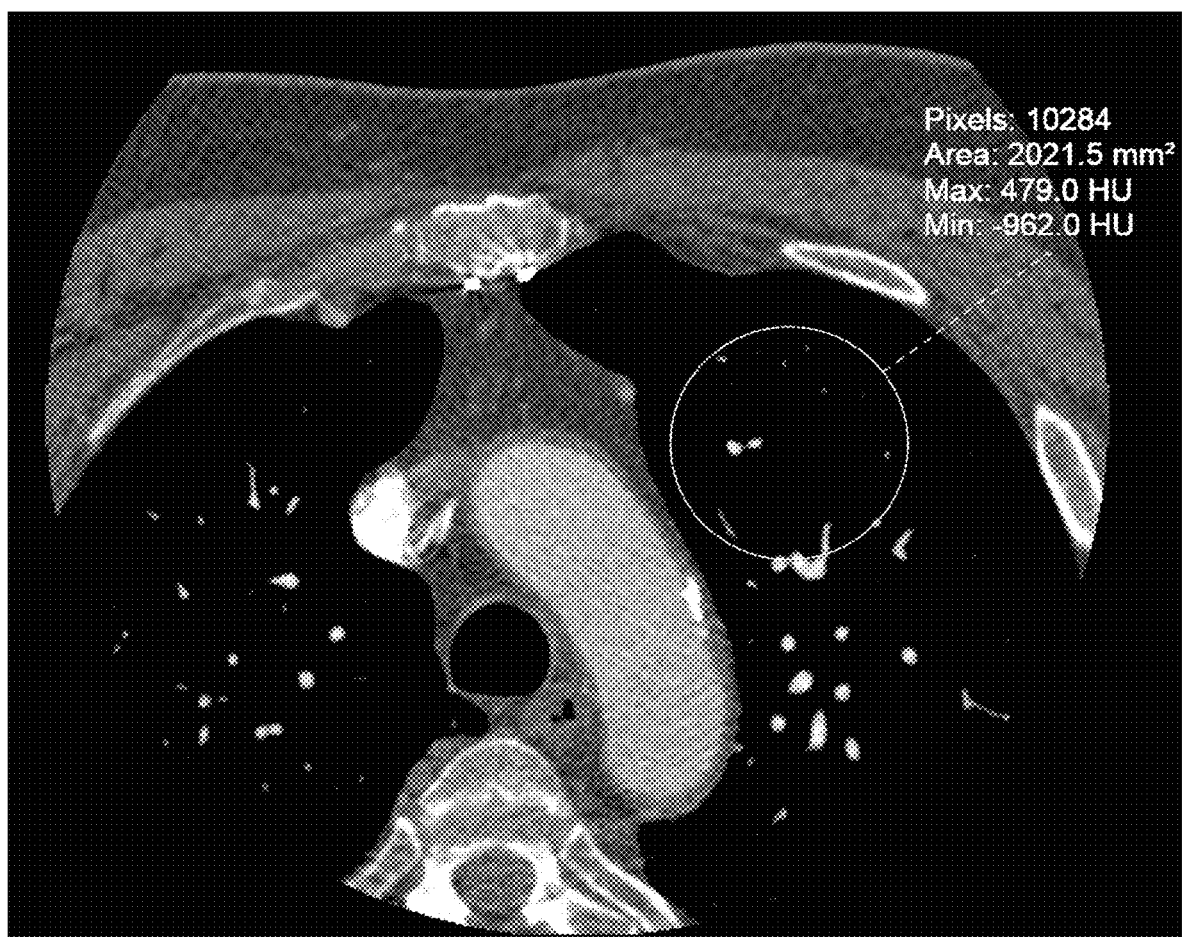

FIGS. 7A and 7B are exemplary image information displayed by an image processing device according to some embodiments of the present disclosure. As shown in FIG. 7A, image information may be located in an image region. The image information may be related to statistical information of a region of interest in the image. The color of the text in the image information may be referred to as a first color (e.g., green). As shown in FIG. 7B, a portion of the image information may locate outside the image region. The image information may be related to the statistical information of the region of interest. The color of the text in the image information may be referred to as a second color (e.g., red). The first color and the second color may be different. The user may be reminded through the color of the text that indicates whether all of the image information locates in the image region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for displaying an image implemented on a computing device having one or more display devices, one or more processors, and one or more storage devices, the method comprising:
   obtaining an image to be displayed by at least one of the one or more display devices, the image including a first region;
   generating a processed image by performing an image processing operation on the image, the processed image including a second region;
   determining whether the processed image satisfies a display standard, wherein the display standard relates to a location status of the second region relative to a location of the first region; and
   in response to determining that the processed image does not satisfy the display standard, generating a response.

2. The method of claim 1, wherein the image includes a graphic representation of an imaging object, the graphic representation of the imaging object being within the first region.

3. The method of claim 1, wherein
   the image includes a region of interest (ROI), and
   the processed image includes reference information associated with the ROI, the reference information associated with the ROI being within the second region.

4. The method of claim 3, wherein the reference information associated with the ROI includes at least one of statistical information of the ROI, comment information of the ROI, or a graphics representation of the ROI.

5. The method of claim 1, wherein the image processing operation includes at least one of rotating, zooming, cutting, or modifying at least a portion of the image.

6. The method of claim 1, wherein the display standard includes that all of the second region locates within the first region.

7. The method of claim 1, wherein the response includes outputting a reminder, the reminder including changing a color of the second region.

8. The method of claim 1, wherein the response includes automatically processing at least one of the first region or the second region such that the processed image satisfies the display standard.

9. The method of claim 1, wherein the response includes:
   providing a modification suggestion for the processed image, and
   executing the modification suggestion such that the processed image satisfies the display standard.

10. The method of claim 1, further comprising:
    in response to determining that the processed image satisfies the display standard, outputting the processed image to the at least one of the one or more display devices for display.

11. A system for displaying an image, comprising:
    one or more display devices;

one or more storage devices comprising a set of instructions; and
one or more processors configured to communicate with the one or more storage devices, wherein when executing the set of instructions, the one or more processors are directed to cause the system to:
  obtain an image to be displayed by at least one of the one or more display devices, the image including a first region;
  generate a processed image by performing an image processing operation on the image, the processed image including a second region;
  determine whether the processed image satisfies a display standard, wherein the display standard relates to a location status of the second region relative to a location of the first region; and
  in response to determining that the processed image does not satisfy the display standard, generate a response.

12. The system of claim 11, wherein the image includes a graphic representation of an imaging object, the graphic representation of the imaging object being within the first region.

13. The system of claim 11, wherein
the image includes a region of interest (ROI), and
the processed image includes reference information associated with the ROI, the reference information associated with the ROI being within the second region.

14. The system of claim 13, wherein the reference information associated with the ROI includes at least one of statistical information of the ROI, comment information of the ROI, or a graphics representation of the ROI.

15. The system of claim 11, wherein the image processing operation includes at least one of rotating, zooming, cutting, or modifying at least a portion of the image.

16. The system of claim 11, wherein the display standard includes that all of the second region locates within the first region.

17. The system of claim 11, wherein the response includes outputting a reminder, the reminder including changing a color of the second region.

18. The system of claim 11, wherein the response includes automatically processing at least one of the first region or the second region such that the processed image satisfies the display standard.

19. The system of claim 11, wherein the response includes:
  providing a modification suggestion for the processed image, and
  executing the modification suggestion such that the processed image satisfies the display standard.

20. A non-transitory computer readable medium, comprising at least one set of instructions, wherein when executed by at least one processor of a computing device, the at least one set of instructions cause the at least one processor to effectuate a method comprising:
  obtaining an image to be displayed by at least one of one or more display devices, the image including a first region;
  generating a processed image by performing an image processing operation on the image, the processed image including a second region;
  determining whether the processed image satisfies a display standard, wherein the display standard relates to a location status of the second region relative to a location of the first region; and
  in response to determining that the processed image does not satisfy the display standard, generating a response.

* * * * *